(12) United States Patent
Lebel

(10) Patent No.: US 7,500,772 B1
(45) Date of Patent: Mar. 10, 2009

(54) MOVING FOG LIGHTS

(76) Inventor: Francis-Xavier J. Lebel, 3415 Lafayette Ave. South, Seattle, WA (US) 98144

( * ) Notice: Subject to any disclaimer, the term of this patent is extended or adjusted under 35 U.S.C. 154(b) by 44 days.

(21) Appl. No.: 11/735,943

(22) Filed: Apr. 16, 2007

(51) Int. Cl.
*B60Q 1/06* (2006.01)

(52) U.S. Cl. ..................................... 362/525

(58) Field of Classification Search .............. 362/505, 362/507, 430, 427, 523–526, 528, 529, 531, 362/35
See application file for complete search history.

(56) References Cited

U.S. PATENT DOCUMENTS

| | | | | |
|---|---|---|---|---|
| 1,151,391 A * | 8/1915 | Pylant | ......................... | 362/531 |
| 1,227,885 A * | 5/1917 | Colburn | ......................... | 362/52 |
| 1,314,906 A * | 9/1919 | Se Cor | ......................... | 362/531 |
| 1,319,630 A * | 10/1919 | Sloop | ......................... | 362/530 |
| 1,400,259 A * | 12/1921 | Black | ......................... | 362/507 |
| 1,444,518 A * | 2/1923 | Nash | ......................... | 362/531 |
| 1,615,435 A * | 1/1927 | Baker | ......................... | 362/427 |
| 1,621,920 A | 3/1927 | Berry et al. | | |
| 1,622,439 A | 3/1927 | Frue | | |
| 1,755,987 A * | 4/1930 | Golden | ......................... | 362/523 |
| 2,239,015 A * | 4/1941 | Powell | ......................... | 362/528 |
| 2,662,605 A * | 12/1953 | Riggs | ......................... | 362/505 |
| 3,325,636 A * | 6/1967 | Roberts, Jr. et al. | ......... | 362/527 |
| 3,361,901 A * | 1/1968 | Mesler et al. | ............... | 362/527 |
| 3,633,020 A | 1/1972 | Macadam | | |
| 3,710,093 A * | 1/1973 | Riehl et al. | .................. | 362/467 |
| 4,428,037 A * | 1/1984 | Cardoza et al. | ............. | 362/250 |
| 4,442,477 A | 4/1984 | Hennessey | | |
| 4,722,030 A * | 1/1988 | Bowden | ...................... | 362/493 |
| 5,639,155 A * | 6/1997 | Kowall et al. | ................ | 362/529 |
| 5,664,865 A * | 9/1997 | Menke | ......................... | 362/35 |
| 2004/0070520 A1 | 4/2004 | Sharp et al. | | |

* cited by examiner

*Primary Examiner*—Sandra L. O'Shea
*Assistant Examiner*—Gunyoung T. Lee
(74) *Attorney, Agent, or Firm*—Crossley Patent Law; Mark A. Crossley

(57) ABSTRACT

A vehicle safety apparatus that includes a set of moving fog lights that are mounted within a housing that is mounted on the front undercarriage of a vehicle, with the fog lights being axially attached and capable of altering their light path in response to changes in steering. The fog lights would move through a connection to a reversible electric motor and an electronic controller. A series of drive arms or rods would link the motor to each of the fog lights. A pair of spaced magnetic sensor attachments linked to the steering rod of the vehicle would be also connected to the electronic controller, thereby allowing the fog lights to slightly move in the angle of direction to which the steering is moving at the same time.

5 Claims, 3 Drawing Sheets

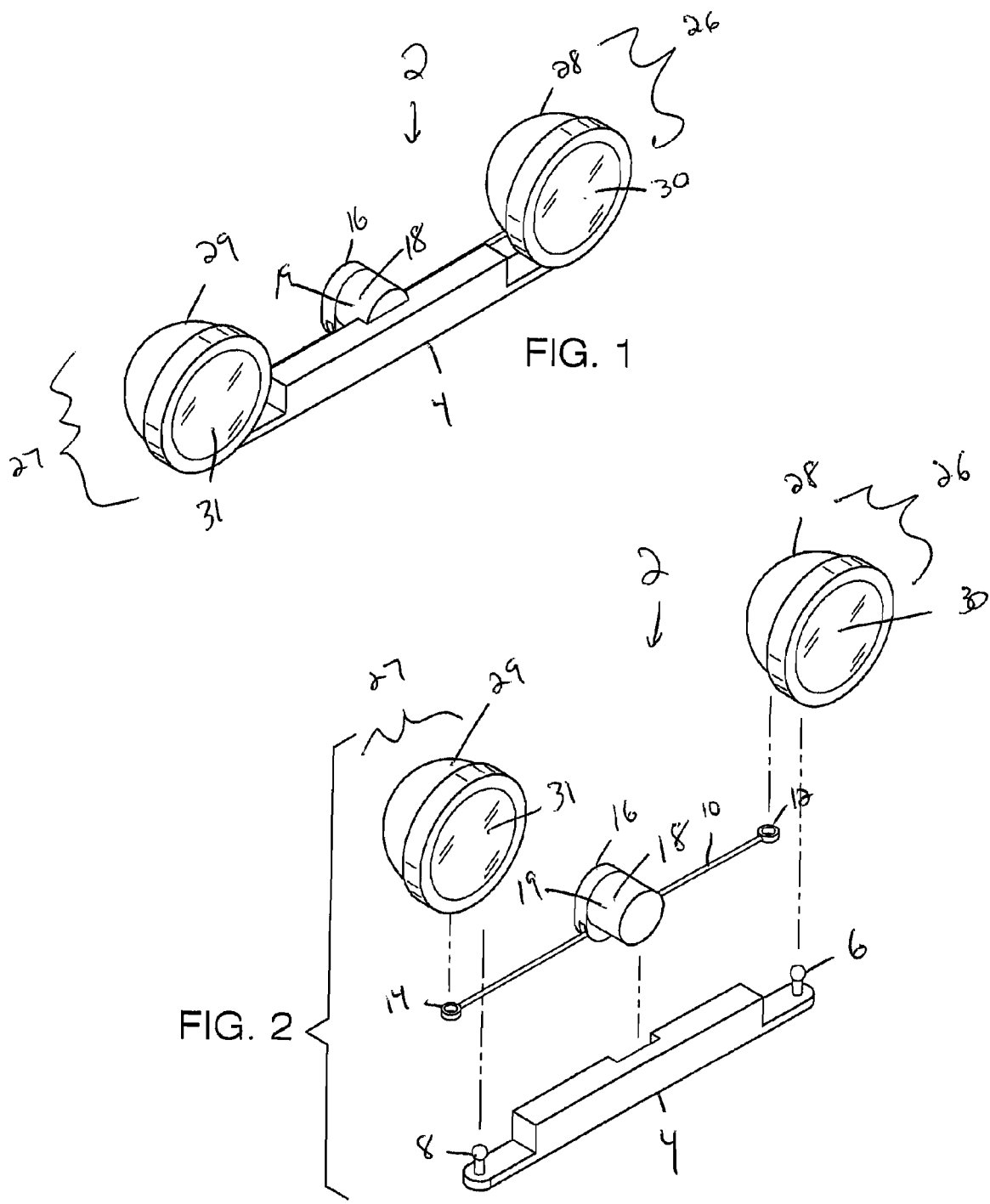

MOVING FOG LIGHTS

BACKGROUND OF THE INVENTION

The present invention concerns that of a new and improved vehicle safety apparatus that includes a set of moving fog lights that are mounted within a housing that is mounted on the front undercarriage of a vehicle, with the fog lights being axially attached and capable of altering their light path in response to changes in steering.

DESCRIPTION OF THE PRIOR ART

U.S. Pat. No. 4,442,477, issued to Hennessey, discloses a steerable lower lighting arrangement.

U.S. Pat. No. 1,621,920, issued to Berry et al., discloses a vehicle lighting system wherein the lights follow the path of travel.

U.S. Pat. No. 1,622,439, issued to Frue, discloses a multi-directional lighting system.

U.S. Pat. No. 3,633,020, issued to Macadam, discloses a front end structure for an automobile in which the front license plate is mounted centrally on the bumper and depends from the bumper.

United States Application No. 2004/0070520 A1, filed by Sharp et al., discloses an electronically steerable light for a vehicle.

SUMMARY OF THE INVENTION

The present invention concerns that of a new and improved vehicle safety apparatus that includes a set of moving fog lights that are mounted within a housing that is mounted on the front undercarriage of a vehicle, with the fog lights being axially attached and capable of altering their light path in response to changes in steering. The fog lights would move through a connection to a reversible electric motor and an electronic controller. A series of drive arms or rods would link the motor to each of the fog lights. A pair of spaced magnetic sensor attachments linked to the steering rod of the vehicle would be also connected to the electronic controller, thereby allowing the fog lights to slightly move in the angle of direction to which the steering is moving at the same time.

There has thus been outlined, rather broadly, the more important features of a vehicle safety apparatus that the detailed description thereof that follows may be better understood and in order that the present contribution to the art may be better appreciated. There are, of course, additional features of the vehicle safety apparatus that will be described hereinafter and which will form the subject matter of the claims appended hereto.

In this respect, before explaining at least one embodiment of the vehicle safety apparatus in detail, it is to be understood that the vehicle safety apparatus is not limited in its application to the details of construction and to the arrangements of the components set forth in the following description or illustrated in the drawings. The vehicle safety apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present vehicle safety apparatus. It is important, therefore, that the claims be regarded as including such equivalent constructions insofar as they do not depart from the spirit and scope of the present invention.

It is therefore an object of the present invention to provide a vehicle safety apparatus which has all of the advantages of the prior art and none of the disadvantages.

It is another object of the present invention to provide a vehicle safety apparatus which may be easily and efficiently manufactured and marketed.

It is another object of the present invention to provide a vehicle safety apparatus which is of durable and reliable construction.

It is yet another object of the present invention to provide a vehicle safety apparatus which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 1 shows a perspective view of the vehicle safety apparatus.

FIG. 2 shows a perspective view of the various components of the vehicle safety apparatus after they are separated from one another.

DESCRIPTION OF THE PREFERRED EMBODIMENT

Figure 3:
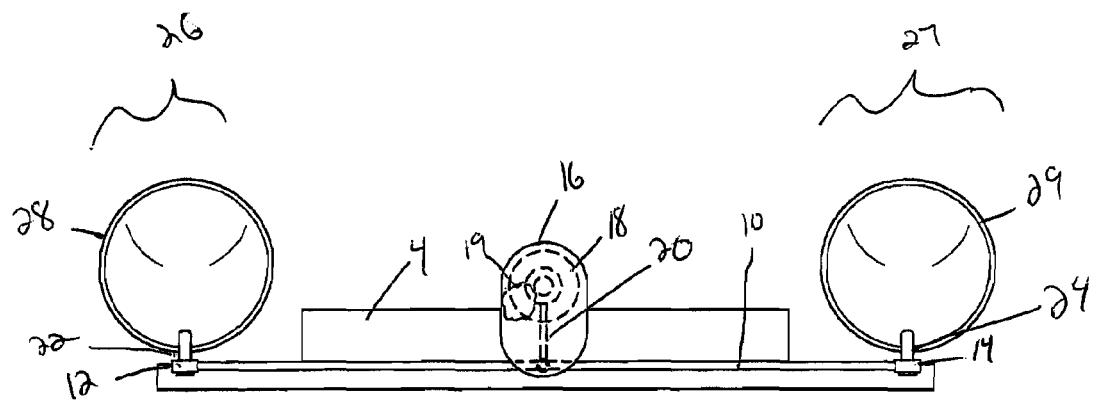
FIG. 3 shows a rear view of the vehicle safety apparatus, as the two fog lights are shown looking forward.
Figure 4:
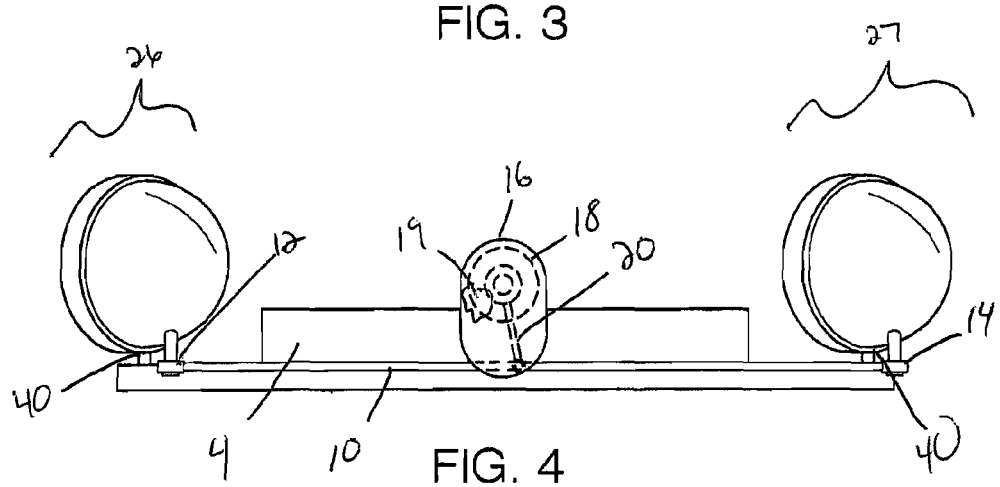
FIG. 4 shows a rear view of the vehicle safety apparatus, as the two fog lights are shown looking slightly to the left.
Figure 5:
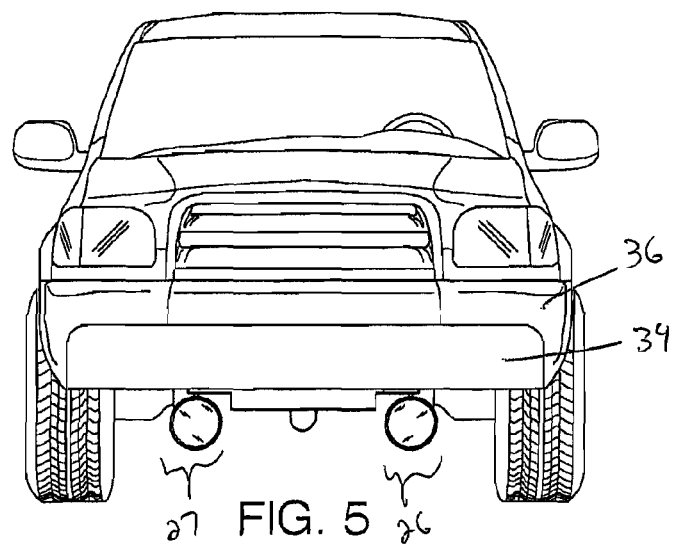
FIG. 5 shows a front view of a vehicle as the vehicle safety apparatus is attached with the fog lights looking forward.
Figure 6:
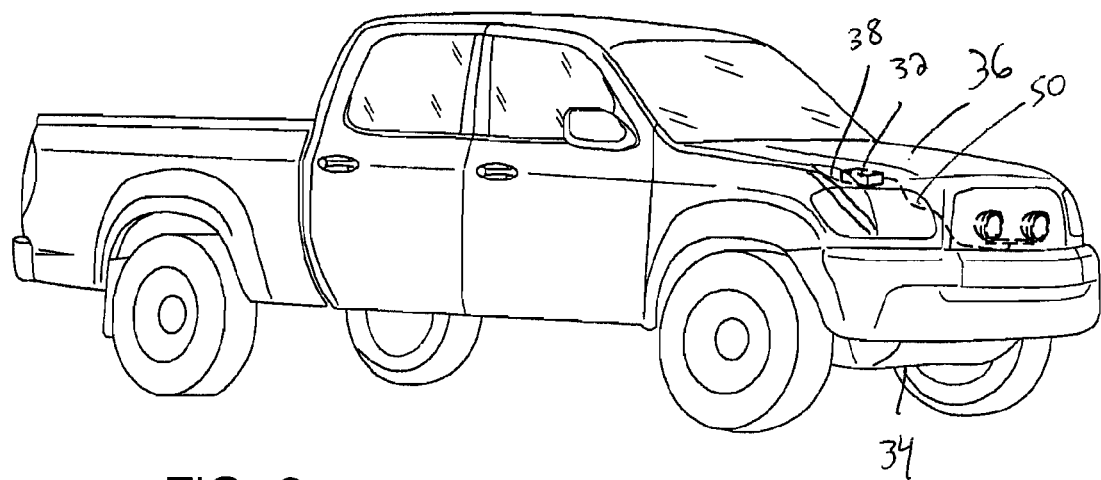
FIG. 6 shows a perspective view of a truck with the vehicle safety apparatus as it would appear attached.
Figure 7:
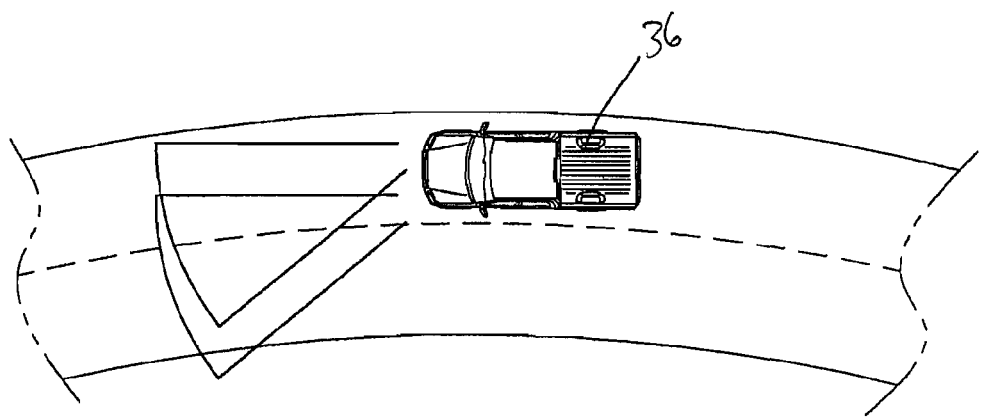
FIG. 7 shows a top view of a truck that using the vehicle safety apparatus.

With reference now to the drawings, and in particular to FIGS. 1 through 7 thereof, a new vehicle safety apparatus embodying the principles and concepts of the present invention and generally designated by the reference numeral 2 will be described.

As best illustrated in FIGS. 1 through 7, the vehicle safety apparatus 2 comprises a support 4 that has two ends comprising a first end and a second end. The support 4 effectively serves as a base in the vehicle safety apparatus 2 and is itself mounted to a vehicle undercarriage 34 of a vehicle 36.

The support 4 has a pair of pin pivots 6 and 8 attached to it, with pin pivot 6 being attached to the first end of the support 4 and the pin pivot 8 being attached to the second end of the support 4. Associated with these two pin pivots 6 and 8 are the two fog lights 26 and 27. Each of the fog lights has an outer housing 28 and 29, respectively, and furthermore, each of the fog lights 26 and 27 have an internal light 30 and 31, respectively.

Each of the two fog lights 26 and 27 has a bottom-mounted hole 40 on its housing 28-29. Fog light 26 can be mounted on pin pivot 6 by placing pin pivot 6 through the hole 40 on the housing 28 of fog light 26, while fog light 28 can be mounted on pin pivot 8 by placing pin pivot 8 through the hole 40 on the housing 29 of fog light 27. Once the two outer housings 28 and 29 are so located, the fog lights 26 and 27 are pivotally attached to the support 4.

Vehicle safety apparatus 2 also has a motor 18, which is housed in motor housing 16. The motor housing 16 is fixedly mounted in the middle of the support 4 approximately halfway in between the first end and the second end of the support 4. Within the motor housing 16 is also located a controller 19, with the controller 19 being physically connected to the motor housing 16 and the motor 18.

To connect the fog lights 26 and 27 to the motor 18, a support rod 10 is present. Support rod 10 has two ends, a first end and a second end, with the first end of the support rod 10 having loop 12 and the second end of the support rod 10 having loop 14. When support rod 10 is properly positioned, the support rod 10 is located co-planar with the support 4 but is slightly behind the support 4 by about one-two inches.

A connector rod 20 is connected to the motor 16 within the motor housing 18 and also is connected to the support rod 10 approximately halfway between the first end and the second end of the support rod 10. Housing 28 has a rear rod 22 connected to it, while housing 29 has a rear rod 24 connected to it. When the fog lights 26 and 27 are properly mounted on the pin pivots 6 and 8, respectively, rear rods 22 and 24 are placed within the loops 12 and 14 that on the support rod 10.

The controller 19 is connected to a movement sensor 32 through wiring 50, with the movement sensor 32 being attached to the steering rod 38 of the vehicle 36. The movement sensor 32 can detect when the steering rod 38 rotates and to what extent. When it detects movement to the steering rod 28, it notifies the controller 19, through the wiring 50. The controller 19 then activates the motor 18, which adjust the connector rod 20 accordingly. The connector rod 20 will be moved in the opposite direction of the turn, causing the fog lights 26 and 27 to rotate slightly in the opposite direction (which is the same direction of the turn of the vehicle). Therefore, if a driver of a vehicle 36 with a vehicle safety apparatus 2 turns left, the fog lights 26 and 27 will also turn slightly to the left, thereby allowing the fog lights to illuminate the area where the vehicle 36 is heading and not the area "straight ahead" of the vehicle 36, which is not helpful from a practical point of view. The same concept would occur if the driver of the vehicle 36 would turn to the right, thereby having the fog lights 26 and 27 turn slightly to the right.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A vehicle safety apparatus in combination with a vehicle, the vehicle safety apparatus comprising
    a support, the support having two ends comprising a first end and a second end,
    a pair of light sources, the pair of light sources comprising a first light and a second light,
    means for mounting the pair of light sources to the support,
    means for mounting the support to a vehicle,
    means for altering a positioning of the pair of light sources when the vehicle changes direction,
    wherein each of the light sources further comprises an external housing, and a light located within each external housing,
    wherein each light source further comprises a fog light,
    wherein the means for mounting the pair of light sources to the support further comprises
        a pair of pin pivots comprising a first pin pivot and a second pin pivot, wherein the first pin pivot is attached to the first end of the support, and further wherein the second pin pivot is attached to the second end of the support,
        a pair of bottom-mounted holes comprising a first hole and a second hole, the first bottom-mounted hole being located on the housing of the first light source, the second bottom-mounted hole being located on the housing of the second light source,
        wherein the first light source is mounted over the first pin pivot by placing the first pin pivot through the first hole located on the housing of the first light source,
        wherein the second light source is mounted over the second pin pivot by placing the first pin pivot through the second hole located on the housing of the second light source,
    wherein the means for altering the positioning of the pair of light sources when the vehicle changes direction further comprises
        a motor, the motor being housed in a motor housing, wherein the motor housing is fixedly attached to the support approximately halfway in between the first end and the second end of the support,
        a controller located in the motor housing, the controller being physically connected to the motor, the controller also being connected to the motor housing,
        means for connecting the pair of light sources to the motor,
        a movement sensor attached to the vehicle,
        a length of wiring connecting the movement sensor to the controller,
    wherein the means for connecting the pair of light sources to the motor further comprises
        a support rod having two ends comprising a first end and a second end,
        a pair of loops comprising a first loop and a second loop, the first loop being attached to the first end of the support rod, the second loop being attached to the second end of the support rod,
        a pair of rear rods comprising a first rear rod and a second rear rod, wherein the first rear rod is connected to the housing on the first light source, further wherein the second rear rod is connected to the housing on the second light source,
        means for connecting the motor to the support rod,
        wherein the first rear rod is inserted through the first loop, and
        further wherein the second rear rod is inserted through the second loop.

2. A vehicle safety apparatus according to claim 1 wherein the means for connecting the motor to the support rod further comprises a connector rod connected to the motor, the connector rod also being connected to the support rod approximately halfway in between the first end of the support rod and the second end of the support rod.

3. A vehicle safety apparatus according to claim 2 wherein the means for mounting the support to a vehicle further comprises
(a) an undercarriage attached to the vehicle,
(b) wherein the support is mounted to the undercarriage of the vehicle.

4. A vehicle safety apparatus in combination with a vehicle, the vehicle safety apparatus comprising
(a) a support, the support having two ends comprising a first end and a second end,
(b) a pair of light sources, the pair of light sources comprising a first light and a second light, each of the light sources further comprising an external housing, each of the light sources further comprising a light located within external housing,
(c) means for mounting the pair of light sources to the support, said means comprising (i) a pair of pin pivots comprising a first pin pivot and a second pin pivot, wherein the first pin pivot is attached to the first end of the support, and further wherein the second pin pivot is attached to the second end of the support, (ii) a pair of bottom-mounted holes comprising a first hole and a second hole, the first bottom-mounted hole being located on the housing of the first light source, the second bottom-mounted hole being located on the housing of the second light source, (iii) wherein the first light source is mounted over the first pin pivot by placing the first pin pivot through the first hole located on the housing of the first light source, and (iv) wherein the second light source is mounted over the second pin pivot by placing the first pin pivot through the second hole located on the housing of the second light source,
(d) means for mounting the support to a vehicle, said means further comprising an undercarriage attached to the vehicle, wherein the support is mounted to the undercarriage of the vehicle, and
(e) means for altering a positioning of the pair of light sources when the vehicle changes direction, said means comprising (i) a motor, the motor being housed in a motor housing, wherein the motor housing is fixedly attached to the support approximately halfway in between the first end and the second end of the support, (ii) a controller located in the motor housing, the controller being physically connected to the motor, the controller also being connected to the motor housing, (iii) means for connecting the pair of light sources to the motor, said means comprising (1) a support rod having two ends comprising a first end and a second end, (2) a pair of loops comprising a first loop and a second loop, the first loop being attached to the first end of the support rod, the second loop being attached to the second end of the support rod, (3) a pair of rear rods comprising a first rear rod and a second rear rod, wherein the first rear rod is connected to the housing on the first light source, further wherein the second rear rod is connected to the housing on the second light source, (4) means for connecting the motor to the support rod, said means further comprising a connector rod connected to the motor, the connector rod also being connected to the support rod approximately halfway in between the first end of the support rod and the second end of the support rod, (5) wherein the first rear rod is inserted through the first loop, and (6) further wherein the second rear rod is inserted through the second loop, (iv) a movement sensor attached to the vehicle, and (v) a length of wiring connecting the movement sensor to the controller.

5. A vehicle safety apparatus in combination with a vehicle according to claim 4 wherein each light source further comprises a fog light.

\* \* \* \* \*